US008750496B2

(12) United States Patent
Thomas (10) Patent No.: US 8,750,496 B2
(45) Date of Patent: *Jun. 10, 2014

(54) COOPERATIVE ENCODING OF DATA BY PLURALITIES OF PARTIES

(75) Inventor: Kasman E. Thomas, Wilton, CT (US)

(73) Assignee: Oracle International Corporation, Redwood Shores, CA (US)

( * ) Notice: Subject to any disclaimer, the term of this patent is extended or adjusted under 35 U.S.C. 154(b) by 245 days.

This patent is subject to a terminal disclaimer.

(21) Appl. No.: 13/040,584

(22) Filed: Mar. 4, 2011

(65) Prior Publication Data

US 2011/0158400 A1     Jun. 30, 2011

Related U.S. Application Data

(63) Continuation of application No. 11/449,494, filed on Jun. 8, 2006, now Pat. No. 7,940,926.

(51) Int. Cl.
*H04L 29/06* (2006.01)
(52) U.S. Cl.
USPC .......................................................... 380/28
(58) Field of Classification Search
CPC ............ G06F 21/6209; H04L 63/0428; H04L 2463/103
USPC .......................................................... 380/28
See application file for complete search history.

(56) References Cited

U.S. PATENT DOCUMENTS

| 4,004,089 A | * | 1/1977 | Richard et al. ................... 380/46 |
| 5,365,589 A | * | 11/1994 | Gutowitz ......................... 380/43 |
| 5,535,393 A | | 7/1996 | Reeve et al. |
| 5,787,175 A | | 7/1998 | Carter |

(Continued)

FOREIGN PATENT DOCUMENTS

| EP | 1 586 976 | 10/2005 |
| EP | 1865651 A1 | 12/2007 |
| WO | WO 02/01271 | 1/2002 |
| WO | 2009033248 A1 | 3/2009 |

OTHER PUBLICATIONS

R.C. Merkle et al. "On the security of multiple encryption," Communications of the ACM, [Online], vol. 24, No. 7, Jul. 1981, pp. 465-467, XP002446598.

(Continued)

*Primary Examiner* — Darren B Schwartz
*Assistant Examiner* — John B King
(74) *Attorney, Agent, or Firm* — Kilpatrick Townsend & Stockton LLP (57) ABSTRACT

Methods and apparatus include cooperatively encoding digital data between collaborating parties. By prior agreement, the parties take turns encoding portions of a given payload (e.g., document), until all portions have been encoded, thereby transforming the payload from a native encoding to a new, composite encoding. Choreography rules facilitate the process. Each party is free to use its own processing scheme. The use of a lookback or chaining step enables each party to impart a quality of informational entanglement to the output during its construction. By virtue of these features and attendant synergies, the resultant jointly encoded digital data enjoys certain novel cryptographic properties in addition to serving as a record of interaction between parties. To decode the data, the process is reversed. Third parties are optionally employed to mediate aspects of the process. Noise and padding, such as watermarks or copyrights, may be added variously to the encoded digital data. Encoding schemes include encryption or compression algorithms.

9 Claims, 5 Drawing Sheets

(56) References Cited

U.S. PATENT DOCUMENTS

| | | | |
|---|---|---|---|
| 5,933,503 A * | 8/1999 | Schell et al. | 713/189 |
| 6,243,480 B1 * | 6/2001 | Zhao et al. | 382/100 |
| 6,282,650 B1 | 8/2001 | Davis | |
| 6,446,093 B2 | 9/2002 | Tabuchi | |
| 6,708,272 B1 | 3/2004 | McCown et al. | |
| 6,963,971 B1 * | 11/2005 | Bush et al. | 713/153 |
| 6,976,166 B2 | 12/2005 | Herley et al. | |
| 6,986,046 B1 | 1/2006 | Tuvell et al. | |
| 7,190,790 B1 * | 3/2007 | Hill et al. | 380/44 |
| 7,940,926 B2 | 5/2011 | Thomas | |
| 2002/0003886 A1 * | 1/2002 | Hillegass et al. | 380/282 |
| 2002/0108035 A1 * | 8/2002 | Herley et al. | 713/165 |
| 2002/0118836 A1 * | 8/2002 | Howard et al. | 380/262 |
| 2002/0138504 A1 * | 9/2002 | Yano et al. | 707/204 |
| 2003/0034905 A1 | 2/2003 | Anton et al. | |
| 2004/0141613 A1 * | 7/2004 | Hayashi | 380/28 |
| 2004/0145661 A1 * | 7/2004 | Murakami et al. | 348/222.1 |
| 2004/0193871 A1 * | 9/2004 | Seshadri | 713/154 |
| 2006/0050880 A1 * | 3/2006 | Taylor et al. | 380/203 |
| 2006/0123029 A1 * | 6/2006 | LeTourneau | 707/101 |
| 2006/0143350 A1 | 6/2006 | Miloushev et al. | |
| 2008/0019505 A1 | 1/2008 | Thomas | |

OTHER PUBLICATIONS

Anonymous, "Cryptographic Protocol Building Blocks," Internet Article, [Online], Sep. 7, 1999, 6 pps., XP002446636.

How to: Use a Thread Pool (C# Programming Guide), Dec. 31, 2005.

U.S. Appl. No. 11/449,494, Non-Final Office Action mailed on Feb. 2, 2010, 25 pages.

U.S. Appl. No. 11/449,494, Non-Final Office Action mailed on Aug. 18, 2010, 26 pages.

U.S. Appl. No. 11/449,494, Notice of Allowance mailed on Jan. 26, 2011, 13 pages.

Oaks et al. Java Threads: Understanding and Mastering Threaded Programming, 2nd Edition, O'Reilly, Jan. 1999.

International Application No. PCT/CA2007/001588, International Preliminary Report on Patentability mailed on Mar. 16, 2010, 4 pages.

International Application No. PCT/CA2007/001588, International Search Report and Written opinion mailed on Jun. 13, 2008, 6 pages.

* cited by examiner

COOPERATIVE ENCODING OF DATA BY PLURALITIES OF PARTIES

This application claims priority and benefit as a continuation application of U.S. patent application Ser. No. 11/449,494, entitled "Cooperative Encoding of Data by Pluralities of Parties," filed on Jun. 8, 2006 now U.S. Pat. No. 7,940,926.

FIELD OF THE INVENTION

Generally, the present invention relates to encoding and decoding of data. Particularly, it relates to multi-party encoding or decoding of data, where parties share a common interest in a collaborative construction and reconstruction of data, such as participants in a transaction, parties having an interest in decoding data with the same parties that encoded it, or parties requiring attestation of a digital payload's authenticity or attestation of is having been collaboratively produced by known entities.

BACKGROUND OF THE INVENTION

Technologies for encoding of documents in alternate digital formats have been known for some time. Archival formats like .zip and .tar are well-known examples. A zip archive is a single, self-contained file in its own right; a first-class document as far as a computer operating system is concerned. But a zip file is actually a re-encoding of one or more source files that have been compressed and concatenated by a host program that understands the zip format. When a zip file is decoded, the constituent files are recovered in their natively encoded state.

In some instances, technologies exist relative to multiple devices, processes, or actors having an interest in safeguarding a payload that is wrapped, countersigned, or multiply encoded. In this case, the encodings are done in such a manner as to require the participation of all the various original actors or devices in recovering the original payload and using it for its intended purpose. Substantial art in this area exists around digital rights management (DRM). However, such art often suffers from a high degree of complexity in terms of requiring multiple wrappers and multiple signatures, and/or other complexities of encoding arising from the special construction of files.

Still other technologies oriented toward multi-party scenarios provide techniques of parallel encoding of pieces of a single document, a so-called concurrent processing approach. Such techniques rely on an ability to divide a document or data stream into individual, independent pieces that, once processed, are stitched together after the fact to create the desired encoded outcome. These divide-and-conquer techniques may be appropriate for cases where the desired output is a straightforward linear concatenation of parts that can be individually encoded without any streamwise dependencies on each other, but they have shortcomings in situations (such as certain cryptographic scenarios) where it is deemed essential that the encoding of any one block of output is dependent on the content of the block that preceded it. The informational entanglement that results when a cipher relies on recently processed output for next-block or next-byte encoding gives rise to what is known in the encryption field as the "waterfall property." This means that if any single bit in a source file is flipped, all downstream bits in the encoded (output) file are potentially affected, making it very likely that the outcome will be substantially different from what it would have been. This is a desirable property for many encryption scenarios. It means that no single segment of the encrypted output can be decoded independently of the segments that came before. The many encryption technologies that rely on this property cannot be carried out in a parallel-processing manner. By definition, parallel processing relies on discrete, separable, independent pieces of work that can be joined together in a single outcome. It is evident that in a two-way encoding/decoding scenario, any piece of a file that can be encoded without regard to the particular encoding of another piece, can also be decoded without regard to another piece, thus destroying the waterfall property.

Further techniques are also known that relate to collaborative transactions or control of documents between multiple parties. In the former, techniques exist for electing certain parties as chair of a group of members with authority, at the expense of the members, to select non-group members, e.g., invitees, to join the group upon proper handshaking. This, however, elevates certain parties over others and gives undue authority to them, which can be sometimes easily compromised. In the latter, techniques exist for apportioning documents into prefix and data sections whereby only ordained group members can access the data sections and do so via the prefix section. The prefix also supports collaborative signatures for identifying individual changes and timing of changes. This, however, creates complexity in the document itself. It also creates undue complexity with the signature scheme.

Nonrepudiation of transactions (the ability to offer proof that a certain party entered into a transaction) is increasingly important in e-commerce. The principal enabling technology for nonrepudiation, in current art, is the "digital signature" (which is notionally analogous to the everyday pen-and-ink signature). Payloads can be digitally signed by one or more parties to show prior possession and/or facilitate detection of data corruption/tampering after a signed message has been sent. Techniques for this are well known. Digital signature technology, however, comes with no particular assumptions around choreography or interaction. The act of applying a signature to something captures that solitary act, but it does not in itself capture the fact of prior two-way interaction between parties. The fact of intentional two-way interaction must be inferred from discrete elements: tokens, assertions, timestamps, digital signatures, session logs, digests, and/or other items (some of which might not be retained after the transaction). Although such shared artifacts, if co-packaged together, might be logically related, they are generally separable physically.

Accordingly, there are needs in the art of encoding and decoding data for simple, yet effective multi-party processing of digital data. The need extends to entangling and disentangling parties in the process such that their actions attest to cooperation between the parties thereby avoiding need for signatures or other identifiers; in other words, an attestation of cooperation should be discernible in the structure of the document. Any processing methods or enabling techniques in this area should also be feasible in real-time and contemplative of good engineering practices, such as relative inexpensiveness, stability, ease of implementation, or the like.

SUMMARY OF THE INVENTION

The above-mentioned and other problems become solved by applying the principles and teachings associated with the hereinafter described cooperative encoding of digital data by plural parties. In one aspect, parties iteratively act via computing systems with various encoding schemes to encode and decode digital data in a single pass through the data. In another, third parties choreograph or mediate aspects of the encoding or decoding process. Other aspects contemplate rules between the parties for encoding or decoding or apportioning the digital data for encoding between the various parties. Still other aspects contemplate the notion of serial forward-hashing of sequential pieces of a document by cooperating parties in a manner that allows for independent choices, by the parties, of shared or non-shared secrets, plus independent selection of encoding algorithms (including halting criterion), to produce interwoven outputs that neither party can decrypt on its own, nor predict the structure of in advance.

Especially, a file of digital data is bandied back and forth between a plurality of parties, each with its own encoding scheme different from the other, to encode the file, halt the encoding and pass the file to the other party until a resultant file is fully encoded. Since each party uses its own encoding scheme, the resultant file has encoding better than it would if only one scheme were used or only one party participated in encoding it. Decoding happens in the reverse and requires that all the parties who encoded the file are necessary when decoding the file. In other words, the invention contemplates a multi-party cooperative model that relies on entanglement of the parties to produce encoded digital data that cannot be decoded piecewise unless the participating parties' keys, encoding logic, halting logic, etc. are also known. In this manner, the collaborative encoding process itself attests to the cooperation of the parties. By contrast, single party encoding models or prior art multiple party models falter, among other things, for lack of entanglement.

In representative embodiments, methods and apparatus include the parties agreeing in advance of encoding to various rules, such as those that specify how much of the digital data of the file will be encoded by each of the parties. Then, in a first encoding scheme by a first party, partial encoding of the file occurs. The first encoding scheme is halted and the file is passed to a second party. In a second encoding scheme different than the first encoding scheme, and by the second party, a portion of the file (other than that partially encoded by the first party) is encoded. If necessary, the second encoding scheme is halted and passed back to the first or another party (and such alternation continued, over possibly many iterations) until the encoding is completed.

To determine halting, various criteria may be employed. For instance, allocating fixed length segments of the file to be encoded or apportioning segments of differing lengths are contemplated. Encoding schemes, on the other hand, include encryption or compression algorithms. Also, entanglement of the parties' own encoding is, in one instance, carried out in such a way that a given party cannot decode its own segments, unilaterally, unless that party has kept a record of various activities, such as the locations (offsets) of control-handoff points and the state of its encoder's logic and memory at those precise points during the original encoding.

In still other embodiments, trusted third parties are optionally used to choreograph the rules of encoding or decoding. The third parties may also serve as an intermediary with certain information known only thereto. Third parties may also mediate disputes during the process.

To add further robustness, the encoding itself may include noise and/or padding from one or more parties. Padding includes items such as watermarks or copyrights. Either noise or padding may additionally be exclusively known by the single party who created it.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, a cooperative or collaborative encoding, and decoding, of digital data amongst plural parties is hereinafter described. Plural parties can also be thought of as persons, corporations or other legal or fictitious entities represented by, perhaps, computing systems or other inanimate entities capable of interaction.

Also, the context of the invention is broad, but the following workplace scenario provides a representative environment. People often work in teams or groups to solve problems or create products. Such work groups are common in corporate departments and businesses and range from research and development to customer support. In many cases, they capture group contributions in one or more "work group documents," namely, documents that are created and/or maintained by the work group. The interplay between members of the group often makes the documents superior and more securely maintained than documents that are produced and secured individually. Common examples of these documents include, but are not limited to, word processor documents and spreadsheets and may contain any combination of text, numbers, source code, schematics, itemized records, images or other information.

Figure 1:
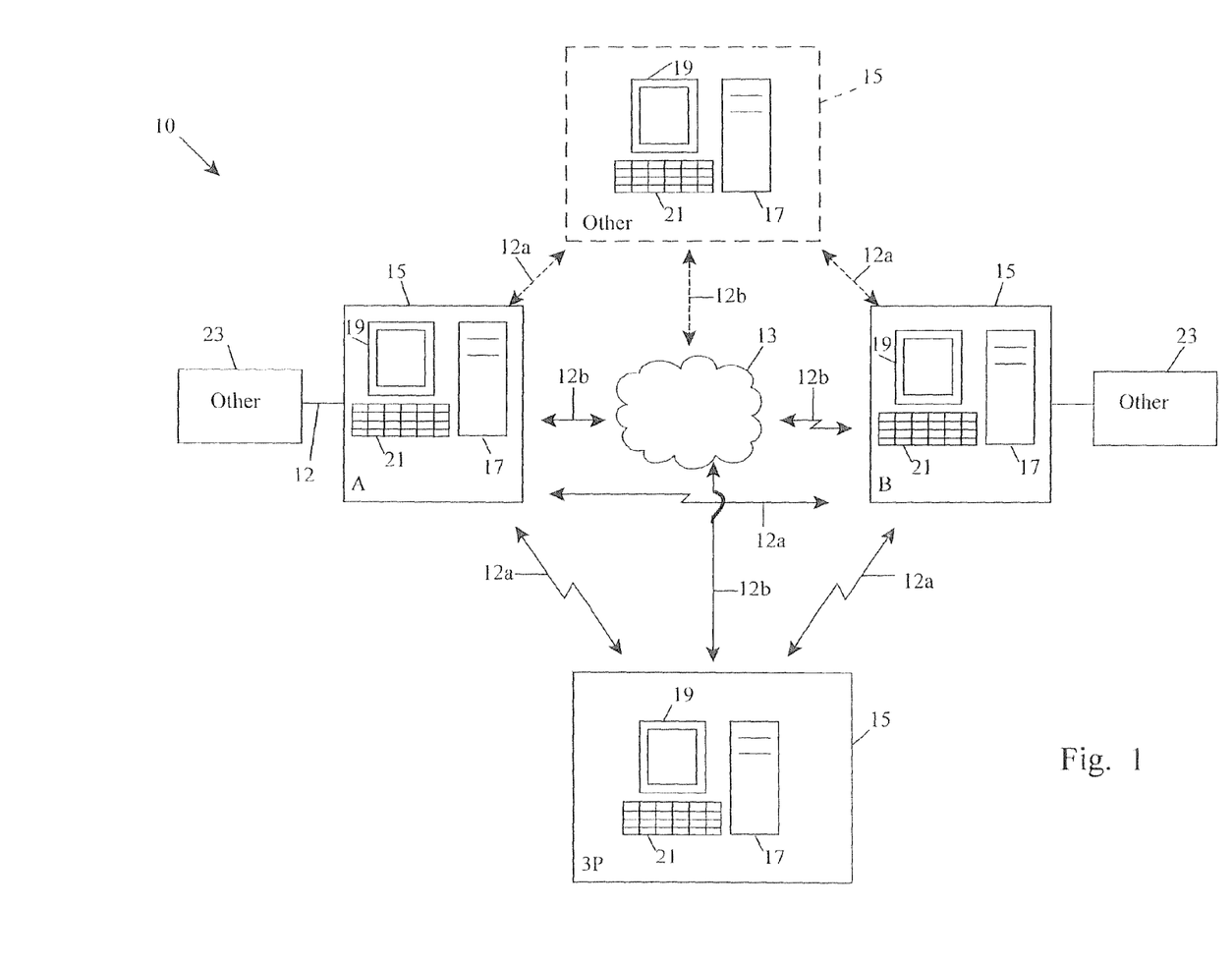
FIG. 1 is a diagrammatic view in accordance with the present invention of a representative operating environment for cooperatively encoding digital data.

With reference to FIG. 1, a representative environment 10 for cooperatively encoding data between parties includes a plurality of parties A and B. Optionally, it further includes one or more additional parties given generically in dashed line format as party OTHER. Also, the parties communicate with one another via wired, wireless or combined connections 12 that are either direct 12*a* or indirect 12*b*. If direct, they typify connections between parties within physical or network proximity (e.g., intranet). If indirect, they typify connections between parties such as via the internet, satellites, radio transmissions or the like, given nebulously as element 13. Intermediaries or other third parties 3P are also contemplated in the environment to optionally facilitate, mediate or otherwise serve the cooperative effort between the parties A and B as they encode, and later decode, data. In this regard, the third party communicates with the parties via one or more of the previously described connections.

In the context when parties embody computing systems in the environment 10, the following provides a brief, general description. That is, particular embodiments of the invention may range from computer executable instructions as part of computer readable media to hardware to firmware or the like used in any or all of the depicted structures 15. Implementation may also be combinations of the foregoing. Also, when described in the context of computer readable media, it is denoted that items thereof, such as modules, routines, programs, objects, components, data structures, etc., perform particular tasks or implement particular abstract data types within various structures of the computing system which cause a certain function or group of functions. In form, the computer readable media can be any available media, such as RAM, ROM, EEPROM, CD-ROM or other optical disk storage devices, magnetic disk storage devices, floppy disks, or any other medium which can be used to store the desired executable instructions or data fields and which can be assessed in the environment.

With reference to computing system 15, an exemplary system includes a general or special purpose computing device (representatively silicon-based, but may also be a quantum or biological computer or other known or hereinafter developed computing device capable of achieving benefit of the invention) shown in the form of a conventional fixed or mobile computer 17 having an attendant monitor 19 and user interface 21. The computer internally includes a processing unit for a resident operating system (suitable operating systems include those, such as DOS, WINDOWS, and MACINTOSH, to name a few, and are similar or different amongst the parties), a memory, and a bus that couples various internal and external units, other 23, to one another. Representative other items 23 include, but are not limited to, PDAs, cameras, scanners, printers, microphones, joy sticks, game pads, satellite dishes, hand-held devices, consumer electronics, mini-computers, computer clusters, main frame computers or the like. Storage devices are also contemplated and may be remote or local (in the context of biological computers, it may even be DNA based). While the line between the two is not well defined, local storage generally has a relatively quick access time and is used to store frequently accessed data, while remote storage has a much longer access time and is used to store data that is accessed less frequently. The capacity of remote storage is also typically an order of magnitude larger than the capacity of local storage.

During use, the computer 17 optionally operates in a networked environment. In this regard, other contemplated items include servers, routers, peer devices or the like. The connections may also be local area networks (LAN) and/or wide area networks (WAN) that are presented by way of example and not limitation. Such are also commonplace in offices using intranets and the internet. When used in networks, the computer 17 typically further includes a modem, T1 line, satellite, microwave relay or other means for establishing communications.

The user interface 21 is capable of launching one or more application programs which are tailored to solve particular problems or manipulate particular types of data. The programs, well known in the art, including without limitation word processors, spreadsheets, database managers, presentation managers, program development tools, etc. and are typical places from which digital data of the invention may be obtained in order to have it cooperatively encoded.

Figure 2:
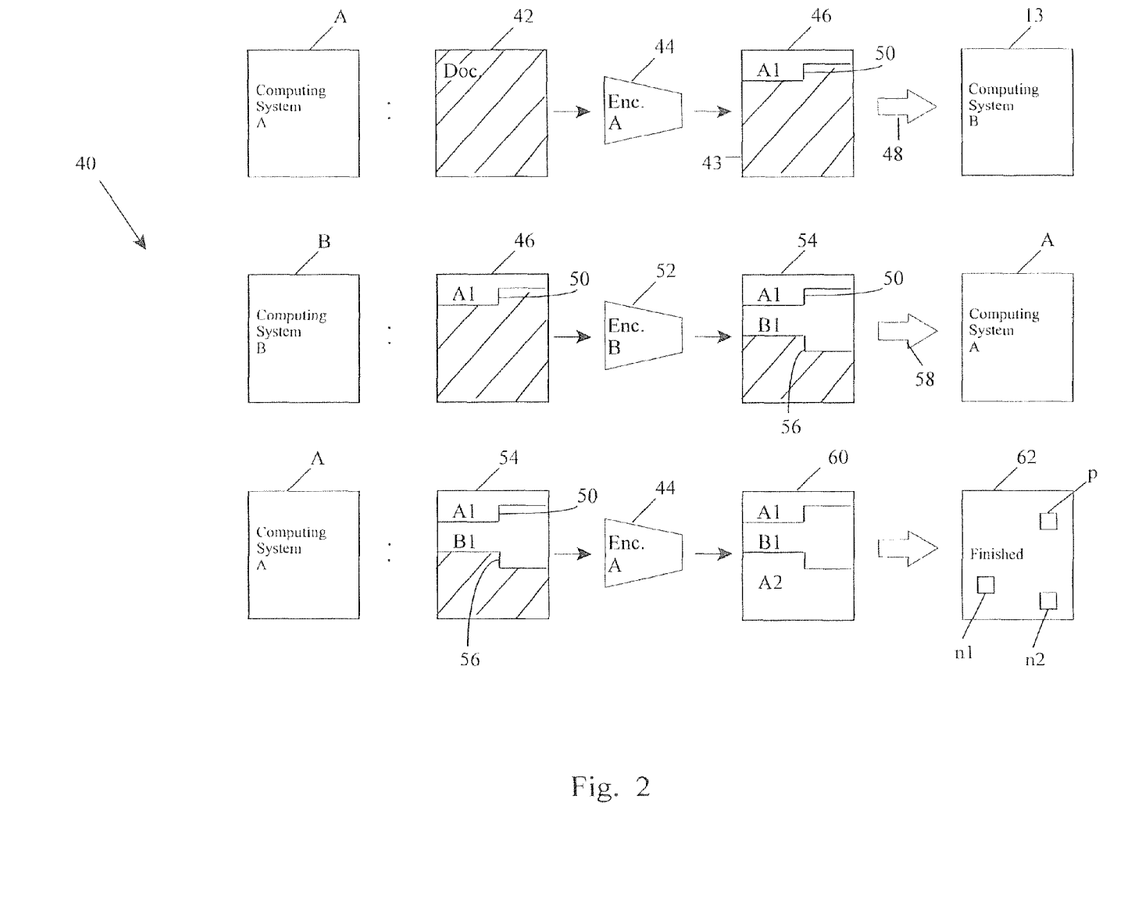
FIG. 2 is a diagrammatic view in accordance with the present invention of digital data being cooperatively encoded.

With reference to FIG. 2, a representative example for cooperatively encoding digital data between parties, especially A and B, is given generically as 40. It will be appreciated, however, that the example provides the basics of the invention but is, initially, fairly simply presented for clarity and understanding and, subsequently, below, with more complex elaborations. To begin, multiple parties, in the form of representative computing systems A and B, intend to jointly encrypt data, especially digital data in the form of a file, such as a document 42. As an assumption, each party also has its own identical copy or version of the document. Therefore, the source data need not be transported back and forth between the parties. Further, each party has its own software (local or remotely accessible) containing an encoder for encoding digital data. It can be in the form of encryption or compression algorithms, or other, and each encoder is different than the other. The parties need not know any details about the other's software. However, each party agrees to abide by interface conventions and/or choreography rules that require a periodic exchange of the data of the document. For instance, representative rules contemplate (1) who begins the process, (2) how much digital data may be encoded by each party, either overall or in terms of a given unit of work, (3) how does an exchange of the digital data occur, (4) what triggers a transfer of control of processing, e.g. constraints on halting criteria, (5) any special constraints or stipulations governing the overall encoding process, such as that the final output must conform to UTF-8 or some other industry-standard data representation scheme, and/or (6) how to mediate problems or handle exceptions. They proceed as follows:

1. According to agreed upon rules, one party (here, Party A) begins the process.

2. The encoder A (44) of party A begins reading the document, such as in serial order of the bytes of the document. It then applies its own special encoding to the bytes or block to partially encrypt the document, especially one byte at a time, until such time as a halting criterion of the encoder or other software has been met. It then stops encoding and outputs new byte values, such as into an output buffer 43. Representatively, the original document 42 has now become document 46 with a portion thereof A1 being encoded. In the vernacular of skilled artisans, this may also be referred to as a ciphertext version of the original data of the document.

Regarding the halting criterion, a decider algorithm decides when to stop processing. It especially decides to stop processing upon meeting any criterion to which the parties stipulated or agreed to in advance, as part of the covenants or rules between the parties. In one simple embodiment, the decider algorithm determines to stop processing after a fixed length of segments has been encoded, such as ten bytes. In other embodiments, fixed or variable segments to be encoded can be allocated or apportioned between the parties. The segments can be left to right in the document or left to right and then right to left or other. Still other versions will be described below.

3. When encoder A stops, Party A transfers or passes the document 46 to Party B, at arrow 48, and asks or notifies Party B to continue encoding. Party B is also to begin encoding at the point or position where Party A left off. In other words, Party B is to begin encoding at a particular offset 50 in the document 46.

4. Party B, by way of Encoder B (52), encrypts document 46 starting at the offset 50 indicated by Party A. As encryption continues, it does so for a period of time such that either the end of the document is reached or until a halting criterion relative to encoder B is met. In this regard, the criterion is the same or different as the criterion relative to encoder A and occurs or not via another decider algorithm relative to encoder B. For instance, it may be some fixed or variable length of byte segments of the document. The constraints governing this will be, as mentioned earlier, typically covered in the choreography rules agreed to beforehand by the parties. Representatively, document 46 has now become document 54 having partially encoded portion A1, via encoder A, and partially encoded portion B1 via encoder B. It also depicts encoding that begin at offset 50 and continued until another offset 56 was reached.

5. At arrow 58, Party B transfers or passes the document 54 back to Party A and asks or notifies Party A to continue encoding. Party A is also to begin encoding at the point or position where Party B left off. In other words, Party A is to begin encoding at offset 56 in the document 54. Alternatively, Party B passes to an OTHER party who continues processing. The OTHER party then passes back to Party A or B or still another party, in accordance with the choreography rules to which the parties stipulated beforehand.

6. Similar to before, transfer of control switches back and forth between the parties until the entirety of the document is encrypted. Representatively, encoder A 44 encodes the remainder of the document 54 and is given as portion A2 in document 60.

7. Eventually, a finished document 62 is achieved. Optionally, the finished document includes padding P or noise n1 or n2 introduced purposely during the encoding process. Representatively, padding is a concealed watermark or copyright. It may also be random, pseudorandom or predictable in nature and provided by only one or more than one of the parties. To the extent only one party utilized it, the padding may be additionally only known to a single party, e.g., the party who created it or otherwise inserted it. The same is true of the noise. Scenarios covering this, and the motivations for them, are described further below.

In more detailed versions of the invention, the following are contemplated:

A. The logic of either of the encoders requires foreknowledge and use, by each party, of a key (a hash-key or secret number) and/or a plurality of keys, and/or key schedulers. Each party might have its own key scheme, unknown to the other party.

B. The logic of one or more encoders operates in such a way as to combine already encrypted information, which is to say data encoded by a previous participant in a previous step (e.g., portion A1) also sometimes called "lookback" bytes in an output stream, with newly encountered bytes in an input stream, e.g., encoder B encrypting portion B1 after portion A1 is encrypted, but incorporating knowledge of A1 into the creation of B1. In other words, Party B could (in one embodiment) hash a certain number of bytes from Party A's A1 portion as a preliminary step in resuming processing with portion B1. Skilled artisans will recognize that such a hash-forward technique has the effect of entangling information of the encodings of the two parties, e.g., A1 and B1, such that neither party acting alone could later reconstruct the original message without full knowledge of the other party's encoding logic.

C. The decider logic relative to either of the encoders, e.g., the logic that decides when to halt processing and transfer control back to the other party, would be non-trivial in nature. For example, the halting criterion might be based on statistical characteristics of lookback characters in the output buffer. In one embodiment, Party A's encoder logic would perform a running calculation of chi-square stats on the most recent x bytes of output, then halt (and transfer control) on reaching a chi-square value that goes outside a certain window. Naturally, a deadlock condition could result if both parties did this, but one embodiment assumes that appropriate additional logic or third party mediation would detect immediate "handbacks" from the other party and provide for deadlock circumvention.

To the extent individual halting criterions of the parties' encoders are driven by statistical or other processes, it is possible (and expected) that encoders may produce outputs of unequal length. For example, Party A might find that its halting criterion (stochastic, in this instance) stops encoding and transfers control to Party B after 12 bytes, then 131 bytes, then 26, 56, 80, 125, 200, 10, etc. Party B, on the other hand, might find its halting criterion stops encoding and transfers control to Party A after 61, 211, etc. In many cases it will be infeasible to predict these offsets in advance. This is particularly true if the parties do not know each other's encoding logic (and keys, etc.), and is true also if one or more parties engage in the hash-forward (entanglement using lookback bytes) technique. Thus, it is possible that one party's encoder might "take over" processing entirely (never halting). To safeguard against this, the parties could agree to maximum-segment-length restrictions. To the extent a lookback, e.g., lookback bytes, is used, neither party can know what the other party's output will look like until it has been received.

D. In a sophisticated implementation, the encoders A and/or B combine compression algorithms with encryption algorithms, optionally with the introduction of pseudorandom data within or at the ends of output segments, e.g., portions A1 or B1. Imagine that a given, fixed length 1000-byte to-be-encoded portion of the document can be compressed to 700 bytes and that the 700 bytes can be encrypted strongly. If Party A then produces 700 bytes in its portion A1 and appends 150 bytes of carefully chosen pseudorandom padding to the end and beginning (e.g., 300 total bytes of padding) before transferring to Party B, the encoded portion of the document so produced can be spliced onto the output stream in such a manner as to "hide" or disguise the presence of a segment delimitation to any would-be attacker thereby making the encoding much more resistant to attack. What is more, the other party (Party B) need not know that any special packaging tactic was used by Party A.

E. Optionally: trusted or neutral third parties 3P (FIG. 1), for example, can be used intermediately to the transfer of control between the parties. The third parties can also be entrusted to secure the encoding schemes of the encoders, such that neither of the enlistees (e.g., parties A and B) knows its own encoding scheme. The allocating or apportioning of how much digital data each party can encode can also be retained by the third party and such is only given to parties with a need-to-know basis. Intuitively, the trusted third parties can then serve as a master choreographer of the events between the enlisted parties.

In any embodiment, certain advantages of the invention over the prior art are readily apparent. For example, the finished document, e.g., 62, provides attestation of cooperative interaction among multiple parties. This eliminates needs for the prior art's complex signatory schemes. It also overcomes prior art schemes that rely on parallel processing, which, while cooperative between parties, provide only for individual party action without interaction. Further, the finished document serves as the one true archival record of a transaction or interaction. This eliminates the prior art's complexity in finding individual changes and timing thereof in collaboratively created documents. In further embodiments, the finished document can, in and of itself, serve as a shared secret for use in creating still other cryptographic outcomes. This adds robustness. More intuitively, the foregoing describes real-time solutions contemplative of being inexpensive, stable, and readily implemented even in resource-scarce environments, such as cell phones, PDA's etc.

Figure 3:
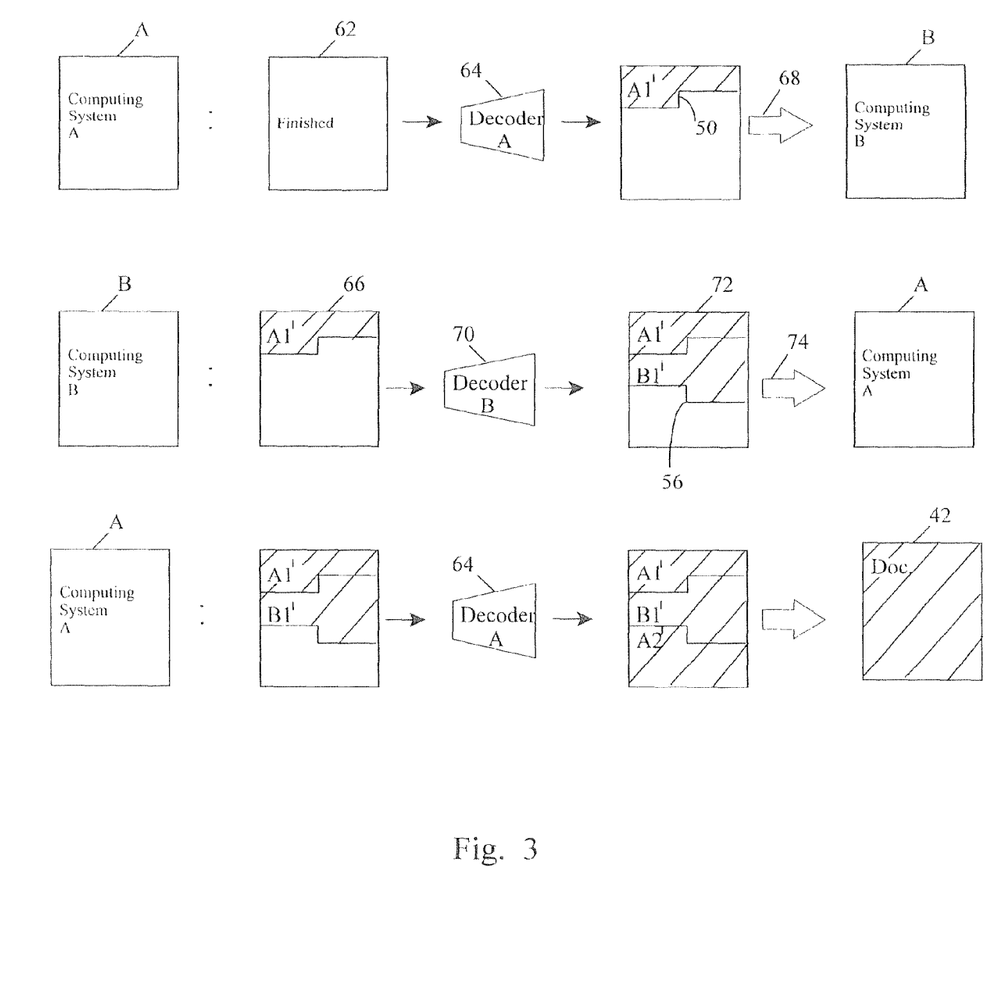
FIG. 3 is a diagrammatic view in accordance with the present invention of the encoded digital data of FIG. 2 being decoded.

With reference to FIG. 3, the decoding of the finished document 62 occurs generally in the reverse of the encoding. That is, the party that began the encoding begins the decoding. Here, that is Party A. Via a decoder A 64, Party A begins decoding the document to produce a portion A1' that is a reconstructed version of the original document. After reaching a halting criterion comparable to before, the decoding ceases and the partially decoded document 66 is passed or transferred to Party B at arrow 68. Via its own decoder B 70 with logic differing from the Party A's decoder, Party B decodes that portion B1' comparable to B1. The resultant document 72 is then passed back to Party A, at arrow 74, to complete decoding of the entire document. Namely, decoder A 64 decodes portion A2' of the document and then the originally encoded document 42 is formed.

Figure 4A:
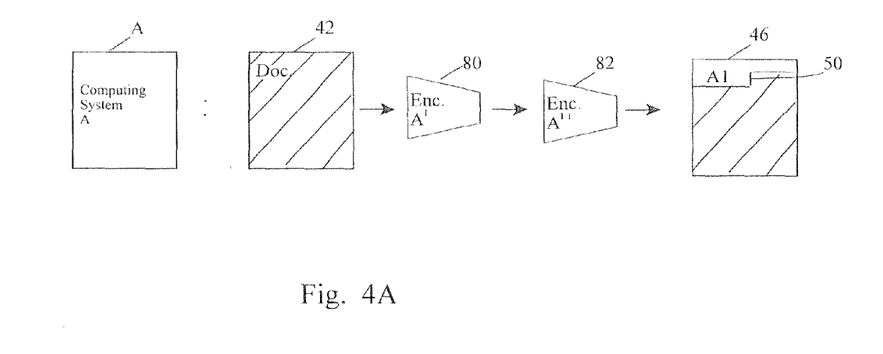
FIGS. 4A and 4B are diagrammatic views in accordance with the present invention of alternate embodiments for encoding digital data with an encoding scheme.
Figure 4B:
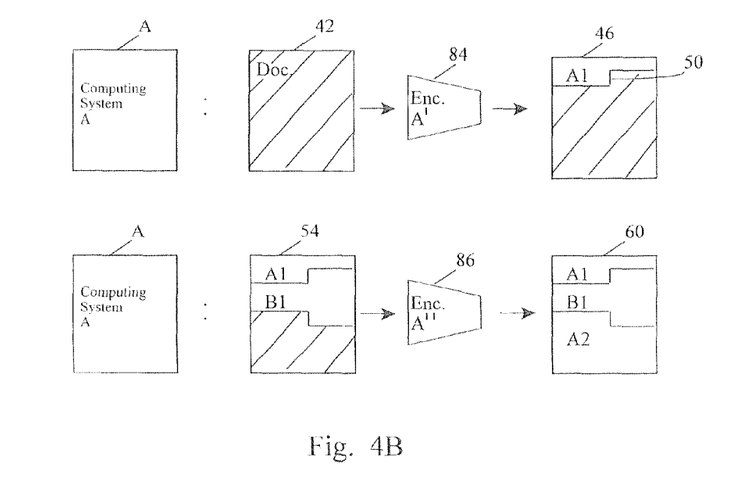

Appreciating that the encoding schemes of any one party may have complex features, FIGS. 4a and 4B show alternate embodiments for encoding by one or more of the parties. In the former figure, the original document 42 is encoded by party A via more than one encoding scheme. Particularly, a first and second encoding schema A' and A" (80 and 82) are combined serially to create encoded portion A1 of document 46. In this regard, compression and encryption algorithms may be used together. In the latter figure, a first encoding scheme, via encoder A' 84, is employed by Party A when encoding document 42 to get portion A1 of document 46 and a second encoding scheme, via encoder A" 86, is employed to encode portion A2 of document 60. Of course, the two encoder schemes could again be compression and encryption algorithms or other. Naturally, skilled artisans can envision still other embodiments, not shown, or devise representative encoding schemes and algorithms.

Figure 5:
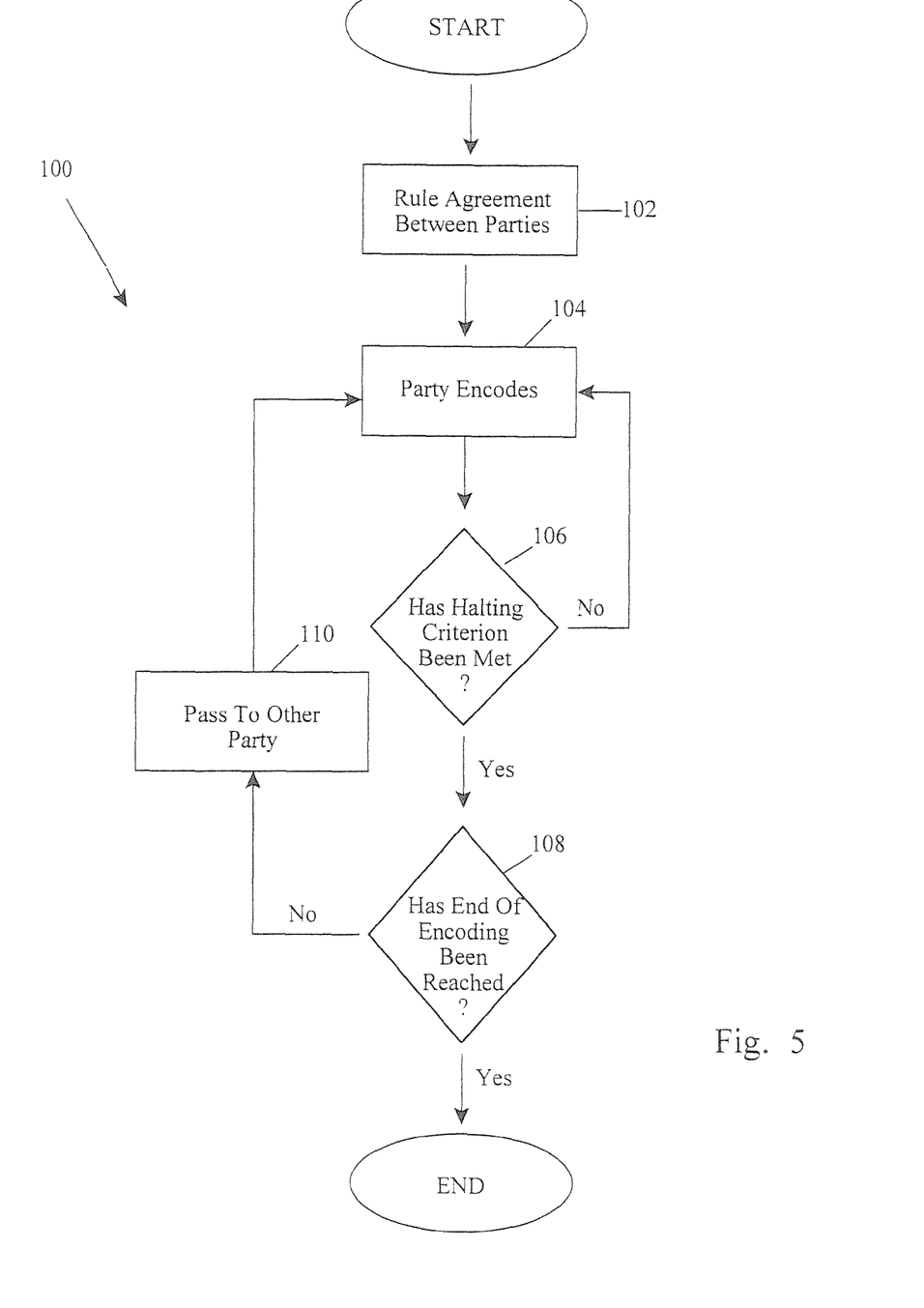
FIG. 5 is a flow chart in accordance with the present invention of a representative method for cooperatively encoding digital data between a plurality of parties.

With reference to FIG. 5, a representative flow chart for accomplishing the cooperative encoding of digital data between parties is given generically at 100. At 102, the parties of collaboration agree to various rules. As before, these contemplate items such as how much digital data will be encoded per party, who begins the process, how transfer is effectuated, is there a third party involved and to what extent, what are the halting criteria, are the halting criteria known to both parties, etc.

At 104, one of the parties begins encoding the digital data. Encoding schemes in this regard include, but are not limited to, compression and/or encryption algorithms. At 106, the party continues encoding until such time as the previously discussed halting criterion of the encoder is met or reached. To the extent the halting criterion is not met, the party continues encoding at 104. Eventually, however, it will be met and a determination regarding the end of encoding will be made at 108.

Because only a single party of the cooperative effort between parties has so far undertaken encoding, a NO result is obtained for the very first determination of whether an entirety of encoding of the data has been reached. Then, at 110, transfer of the encoding is passed to the other party where the other party encodes until a further determination is made at 106 whether the halting criterion is met. When met, the process 100 iteratively repeats until the encoding ceases at 108.

Example

In the following example, plural parties with differing encoding schemes were found to successfully achieve cooperative encoding of digital data and did so with entanglement of information (thus attaining the "waterfall property" described earlier). Namely, Lincoln's Gettysburg Address was used as the document to be encoded and, regarding digital data, included 1,473 bytes of text in 7-bit ASCII form. A first party's encoder relied on a fixed-segment-size halting criterion scheme while the other party's used a pseudorandom halting criterion scheme. In other words, the first party encoded bytes of the document until a predetermined fixed number of bytes had been encoded. Control then transferred to the other party where encoding continued until a number of bytes were encoded as permitted under a statistically motivated halting criterion. The process continued back and forth until the document was encoded. Among other things, it was found that while the overall entropy of the final encoded document was usually close to the arithmetic average of the entropy obtained with either encoder used in isolation, expectations through suitable fine-tuning of parameters will achieve, in some cases, synergy encoding or encryption that is stronger than the sum of the individual encoding schemes.

For the encoding scheme of the first party's encoder, an encryption algorithm was used and simply included:
output [i]=currentCharCode ^ lookbackCharacter ^ 7;
(where the halting criterion determined whether a fixed length segment of 100 bytes was reached or not. If reached, encoding with the first encoding scheme stopped and transferred to the other party).

For the encoding scheme of the second party's encoder, an encryption algorithm was used and included:
output [i]=lookbackCharacter ^ (127 & this.hash);
this.hash ^=~(this.hash*this.MAGIC_NUMBER++)>>>5;
 //update hash with initial hash value of 13 and halting logic of:
if (this.hash % this.modulo==0)//break!
return i; //return the offset at which the first party should resume with this.modulo==103.

Continuing, the entropy of the first encoding scheme of the (7-bit) output when the algorithm was used, singly, for the entire file was 6.94052776207447 bits per 7-bit byte. For the second encoding scheme algorithm, used alone, the output stream's entropy was 6.940213986352218 bits per byte. When the two encoders were used together in the manner taught by this invention, and with the parameters shown above, the resulting encryption of the Gettysburg address gave entropy of 6.943195003454467 bits per byte, with the first encoder having processed 60.83% of the input and the second encoder having processed 39.17% of the input. As is seen, slightly higher entropy is achieved via the use of the two encoding schemes rather than any one encoding scheme. Note: ECMAScript was the programming language in the foregoing example and the input data consisted of 7-bit ASCII text. But it will be appreciated by any skilled artisan that the invention is not constrained by the choice of programming language or the input data's native encoding.

Preliminary Security Analysis:

To get an idea of how secure a file of digital data encoded according to the above scheme might be, consider the case where only two parties, A and B, and where, further, parties each encode exactly 50% of a file of the digital data, with only one transfer of control between the parties occurring at the midpoint of the to-be-encoded document. In the extremely insecure case, the likelihood that an attacker could detect the presence of two encryptions (by standard cryptanalysis techniques) in the output is high, and the likelihood of the attacker finding the "join point" or midpoint can be assumed to be correspondingly high. As a result, the difficulty of decoding or decrypting the file reduces, essentially, to the difficulty of deciphering the first half of the output file, and (independently) the difficulty of deciphering the second half of the output file. To the extent one encryption algorithm is much "stronger" than the other, it can be said that the difficulty of the overall problem is just the difficulty of deciphering the stronger half. Alternatively, it is said that the difficulty approaches that limit in some suitably asymptotic fashion, etc.

Changing the scenario to that of multiple equidistant or spaced join points in the finished document (arising from fixed-length halting criteria observed per each party, such that each party ends up encoding numerous small equal length segments), the attacker is faced with inconvenience in locating the segment endpoints, e.g., offsets (FIG. 2), but otherwise the problem is not substantially harder than before.

However, to further change the scenario, it is postured that a finished document, e.g., 62 (FIG. 2) contains many segments of unequal length, e.g., portions A1, B1, A2. If the portion or segment lengths are long enough, it is expected that statistical methods (chi-square, etc.) might fairly readily detect their presence or locations. But if the portions or segments are fairly short (in turn, the halting criterion is set to occur after a relatively short portion of encoding), the sampling noise inherent to short segments will tend to defeat chi-square, pi-convergence, entropy, and other standard tests, particularly if segment end, e.g., offsets (FIG. 2), have been carefully chosen with pseudorandom lengths or byte sequences.

Finally, one of ordinary skill in the art will recognize that additional embodiments are also possible without departing from the teachings of the present invention. This detailed description, and particularly the specific details of the exemplary embodiments disclosed herein, is given primarily for clarity of understanding, and no unnecessary limitations are to be implied, for modifications will become obvious to those skilled in the art upon reading this disclosure and may be made without departing from the spirit or scope of the invention. Relatively apparent modifications, of course, include combining the various features of one or more figures with the features of one or more of other figures.

What is claimed:

1. A method of cooperatively encoding digital data between a plurality of parties, comprising:
   encoding a first portion of the digital data in a first encoding scheme by a first of the plurality of parties, the first encoding scheme being implemented by a first encoder known only to the first party and wherein the first portion can be decoded by only the first party;
   encoding a second portion of the digital data in a second encoding scheme different than the first encoding scheme and by a second of the plurality of parties, the second encoding scheme being implemented by a second encoder known only to the second party and wherein the second portion can be decoded by only the second party; and
   adding noise or padding during the-encoding of the first and second portions, wherein the noise or padding is only known to a single party of the first and second parties who added the noise or padding.

2. The method of claim 1, further including mutually agreeing by the first and second parties to rules for encoding in advance of encoding the first portion and encoding the second portion.

3. The method of claim 1, further including iteratively passing the digital data between the first and the second party until all of the digital data is encoded.

4. The method of claim 1, further including securing the first and second encoding schemes with a third of the plurality of parties.

5. The method of claim 4, further including choreographing by the third party the encoding of the first and second portions.

6. The method of claim 1, further including halting the partially encoding upon a meeting of a halting criterion whereby the encoding of the first and second portions result in encoding by the parties of differing lengths.

7. A system comprising:
   a first device comprising a processor and a memory, the memory storing a set of instructions which, when executed by the processor of the first device, causes the first device to encode a first portion of digital data in a first encoding scheme, the first encoding scheme being implemented by a first encoder known only to the first device and wherein the first portion can be decoded by only the first device; and
   a second device comprising a processor and a memory, the memory storing a set of instructions which, when executed by the processor of the second device, causes the second device to encode a second portion of the digital data in a second encoding scheme different than the first encoding scheme, the second encoding scheme being implemented by a second encoder known only to the second device and wherein the second portion can be decoded by only the second device, and further comprising adding noise or padding during the encoding of the first and second portions, wherein the noise or padding is only known to a single device of the first and second devices which adds the noise or padding.

8. The system of claim 7, further including iteratively passing the digital data between the first and the second devices until all of the digital data is encoded.

9. The system of claim 7, further including halting the encoding upon a meeting of a halting criterion whereby the encoding of the first and second portions result in encoding by the devices of differing lengths.

* * * * *

UNITED STATES PATENT AND TRADEMARK OFFICE
CERTIFICATE OF CORRECTION

| | | Page 1 of 1 |
|---|---|---|
| PATENT NO. | : 8,750,496 B2 | |
| APPLICATION NO. | : 13/040584 | |
| DATED | : June 10, 2014 | |
| INVENTOR(S) | : Thomas | |

It is certified that error appears in the above-identified patent and that said Letters Patent is hereby corrected as shown below:

In the Specification

In column 9, line 32, delete "4a" and insert -- 4A --, therefor.

Signed and Sealed this
Third Day of February, 2015

Michelle K. Lee
*Deputy Director of the United States Patent and Trademark Office*